(12) United States Patent
Kramer et al.

(10) Patent No.: US 7,306,862 B2
(45) Date of Patent: Dec. 11, 2007

(54) REMOVABLE STORAGE METHOD FOR HYDROGEN AND HYDROGEN RESERVOIR

(75) Inventors: Dominik Kramer, Eggenstein-Leopoldshafen (DE); Jörg Weismüller, Karlsruhe (DE); Herbert Gleiter, Karlsruhe (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 942 days.

(21) Appl. No.: 10/704,394

(22) Filed: Nov. 8, 2003

(65) Prior Publication Data
US 2005/0016866 A1    Jan. 27, 2005

Related U.S. Application Data

(63) Continuation-in-part of application No. PCT/EP02/04690, filed on Apr. 27, 2002.

(30) Foreign Application Priority Data
May 23, 2001   (DE)   ................................ 101 25 546

(51) Int. Cl.
*C01B 3/00*   (2006.01)
(52) U.S. Cl. ....................... 429/20; 429/22; 429/218.2
(58) Field of Classification Search .................. 96/108, 96/143; 429/12, 13, 19, 20, 21, 22, 30, 218.2
See application file for complete search history.

(56) References Cited

U.S. PATENT DOCUMENTS

| | | | |
|---|---|---|---|
| 2002/0106541 A1* | 8/2002 | Yamada et al. | 429/21 |
| 2002/0127466 A1* | 9/2002 | Ovshinsky et al. | 429/50 |
| 2007/0000388 A1* | 1/2007 | Huang et al. | 96/108 |

FOREIGN PATENT DOCUMENTS

| | | |
|---|---|---|
| JP | 002210918 | 7/1998 |
| WO | WO 91/12199 | 8/1991 |
| WO | WO 96/09982 | 4/1996 |

OTHER PUBLICATIONS

Browning, D. et al., "An Investigation of Hydrogen Storage Methods for Fuel Cell Operation With Man-Portable Equipment", *Journal of Power Sources*, vol. 65, No. 1, Mar. 1, 1997, pp. 187-195.

* cited by examiner

Primary Examiner—Frank M. Lawrence
(74) Attorney, Agent, or Firm—Klaus J. Bach

(57) ABSTRACT

In a method of reversably storing hydrogen in a hydrogen reservoir including a hydrogen storage material disposed between an electrode and a counter electrode, the hydrogen storage material is charged with hydrogen and the hydrogen is recuperated from the hydrogen storage material by applying between the electrodes a voltage differential to generate a current flow across the electrolyte which is adjustable for controlling the rate of release of the hydrogen from the hydrogen storage material.

5 Claims, 5 Drawing Sheets

REMOVABLE STORAGE METHOD FOR HYDROGEN AND HYDROGEN RESERVOIR

This is a Continuation-In-Part application of International Application PCT/EP02/04690 filed Apr. 27, 2002 and claiming priority of German application 101 25 546.2 filed May 23, 2001.

BACKGROUND OF THE INVENTION

The invention relates to a method of reversably storing hydrogen and to a hydrogen reservoir.

The storage of hydrogen is a problem particularly when hydrogen is to be used as an energy source and energy transport medium. Hydrogen can easily be manufactured by the electrolysis of water for example using electricity generated by solar cells. The energy stored in the form of hydrogen can then be recuperated by combustion of the hydrogen, but it can also be converted directly into electrical energy by way of fuel cells. However, the problem of storing the hydrogen, especially small amounts and particularly for mobile applications (fuel cell cars), has not been satisfactorily solved so far.

Since the conventional storage materials for storing hydrogen are not satisfactory, particularly for future applications, improved concepts and materials are urgently needed. Many materials have already been manufactured for that purpose and have been tested in various temperature and pressure ranges. It is however desirable to have, in addition to the material composition, the pressure and the temperature, other variables which could change the hydrogen storage properties of a hydrogen reservoir or a hydrogen storage material.

Conventional storage arrangements require expensive auxiliary components such as compressors for operating the hydrogen pressure reservoirs. In cryo storage arrangements, the infrastructure requirements are particularly high since special cooling equipment for very low temperatures of $-253°$ C. ($20°$ K) is required. The storage system transfer lines and tank couplings must be super-insulated in order to avoid fast and premature evaporation of the liquid hydrogen. A disadvantage of the metal hydride storage devices is that, depending on the alloy, for the release of the hydrogen either high temperatures or additional pumps are required. Chemical storage devices require reformers, which must be heated and/or an expensive regeneration of the storage devices.

The construction and the operation of the auxiliary equipment requires energy, occupies space, which may be critical with mobile applications, and is expensive. In some cases, for example with reformers or apparatus, which must be heated to relatively high temperatures, the response time may present a problem.

Although electrolysis apparatus can be used for the production of hydrogen, they require large amounts of energy. They are therefore economically not feasible as hydrogen, that is, energy suppliers in the sense of a hydrogen economy.

It is the object of the present invention to provide a method and an apparatus for storing hydrogen for use as energy source wherein the hydrogen is released at relatively low temperatures.

SUMMARY OF THE INVENTION

In a method of reversably storing hydrogen in a hydrogen reservoir including a hydrogen storage material disposed between an electrode and a counter electrode, the hydrogen storage material is charged with hydrogen and the hydrogen is recuperated from the hydrogen storage material by applying between the electrodes a voltage differential to generate a current flow across the electrolyte which is adjustable for controlling the rate of release of the hydrogen from the hydrogen storage material.

The hydrogen is stored and subsequently released in a dosed manner by the following process:

For charging the storage device with hydrogen, gaseous hydrogen is supplied to the storage device. The hydrogen is supplied in the storage apparatus by way of a suitable system of pipes, channels, pores or similar structures to the hydrogen storage electrode. The gas space extends either to the H-storage electrode (for example, by providing the H-storage electrode also in the form of a tube) or the hydrogen is conducted close to the electrode (for example, up to a thin electrolyte layer on the electrode).

There the hydrogen is absorbed by the storage electrode, which consists of a hydrogen storage material such as palladium, magnesium or magnesium alloys such as $Mg_2Ni$, $Mg_2Cu$. The storage electrode has a very large surface. To this end, it is for example sponge-like, constructed from nano-fibers, or it consists of thin layers disposed on a substrate so that the hydrogen can be rapidly absorbed.

When hydrogen is needed, a DC voltage is applied between the storage electrode and an opposite electrode. The current generated thereby (between the storage electrode and the opposite electrode) through the electrolyte results in a displacement of the charges and a change of the electrochemical double layer in front of the electrodes. As a result, the electronic state density in the electrode changes and its storage capacity is reduced. The hydrogen is released from the electrode, is collected by the gas conduit system and discharged from the storage device.

The voltage source must be able to provide for a constant current flow (galvanically static operation) in order to provide for a uniform release of hydrogen. The voltage used must not exceed the decomposition voltage of the respective electrolyte. The apparatus presented herein does not perform any electrolysis. The charge should not pass through the interface area electrode/electrolyte, only a surface charge is desirable. If the maximum voltage of the voltage source used exceeds the decomposition voltage of the electrolyte a voltage limiter is to be employed.

A hydrogen reservoir or storage device must not only accept and store the hydrogen, it must also be able to release it in a dosed or controllable manner. In a fuel cell car, this occurs upon acceleration that is when there is an increased demand for power. When the gas pedal is pressed down, the required amount of hydrogen should be supplied without delay.

When the hydrogen reservoir is being filled, the hydrogen storage device should take in the $H_2$ gas readily and rapidly that is without the need for high pressures.

For storing electrically conductive hydrogen, storage material is used. The usable hydrogen is stored mainly at the surface or, respectively, near the surface of the material. For that reason, the material has a very large surface; it is disposed in the device for example sponge-like or in the form of a thin film deposited on a conductive carrier.

The absorption and the release of the hydrogen is controlled by way of a charge layer on the surface of the hydrogen storage material which, for this purpose, is completely or to a large extent covered by an electrolyte. By means of a counter electrode and a finely adjustable voltage or, respectively, current source, the charge at the surface and, as a result, the hydrogen storage capacity can be changed.

The hydrogen device according to the invention can absorb or release hydrogen as desired also at a constant temperature and constant pressure in the storage device.

The arrangement of such storage devices is similar to those of electrolysis apparatus for example apparatus for the electrolysis of water for the production of hydrogen. Here, the water is dissociated by the electric current.

However, the storage device described herein does not carry out any electrolysis; a charge penetration through the interface electrode/electrolyte should not occur. Only a surface charge is to be generated.

For all apparatus with mechanical components, there are questions concerning their life expectancy and service requirements.

For conventional storage materials, the pressure and temperature range where hydrogen is absorbed and released is determined by the composition of the material. It is desirable to adapt the pressure and temperature ranges to the technical requirements. Conventionally, this required the use of the additional components mentioned earlier or a change of the composition of the material by which also the storage properties of the storage material were changed. The possibility of changing the storage properties without changing the composition of the storage material is therefore be very desirable and advantageous.

A combination of a hydrogen storage material with an electrolyte wetting the electrolyte and a voltage source for changing the storage properties permits changing the storage properties of the hydrogen storage material. The hydrogen reservoir or storage device disclosed herein comprises electrodes immersed in an electrolyte and a voltage source connected thereto similar to an apparatus for the electrolysis. However, in accordance with the invention, the apparatus does not generate any hydrogen by electrolytic dissociation of water (there is no charge transfer through the interface between electrolyte and electrode), but hydrogen is only stored and again released because of a change of the properties of the hydrogen storage material by the electrochemical double layer. Although a passthrough reaction may occur at the counter electrode, in principle, the apparatus is so designed that only a double layer charge is formed at the counter electrode. Then the typical features of an electrolysis such as diaphragm/separation membranes for separating the cathode and anode spaces can be eliminated. There are also no means for the removal of oxygen as they are required for the electrolysis of water.

Since the usable hydrogen storage area is on the surface, a typical feature of the invention is the dependency of storage capacity on the surface area wetted by an electrolyte. The reservoir or storage device described herein can absorb or release hydrogen at constant temperature and constant pressure as desired. The process is controlled by way of a finely adjustable voltage or, respectively, current source, which generates a charge layer on the surface of the hydrogen storage material. Therefore heating and cooling equipment and pumps, or respectively, compressors may at least be relatively simple and therefore inexpensive or such equipment may be completely eliminated. Since heating is not necessary and no chemical compound needs to be reformed, there are also no delay times.

The invention provides for the possibility to improve the properties of known and tested materials as well as future materials by making it possible to change their properties. Since with the arrangement according to the invention the charge at the surface of the materials can be changed, the electronic condition density and, consequently, the hydrogen storage capacity can be changed. Considering the urgent search for better hydrogen storage devices the present invention provides a valuable option.

The invention is based on the effect that the hydrogen storage capacity of a storage material can be influenced by a charge in an adjacent electrochemical double layer.

In some experiments performed so far palladium foil (25×25×0.025 mm) was used as a storage material. As electrolyte, a solution of lithium perchloride in methylacetate was used. The surface areas examined so far were relatively small and with these testing arrangements only a relatively small controllable storage capacity were available (particularly in comparison with the conventional storage capacity of the palladium). Therefore it was not tried to detect gaseous hydrogen but the change of the hydrogen storage capacity was detected indirectly by way the current flow by wetting the palladium foil in a double-cell arrangement at one side with phosphoric acid and glycerol. From this side, the palladium foil could be charged with hydrogen.

Below the invention will be described on the basis of exemplary embodiments with reference to the accompanying drawings.

DESCRIPTION OF EXEMPLARY EMBODIMENTS

The hydrogen storage and release is controlled by means of an external voltage source providing for a charge layer on the storage material.

The hydrogen storage apparatus according to the invention comprises the following essential component:

An electrode of a hydrogen storage material.
An electrolyte
A counter electrode
A voltage source between the electrodes
A gas supply and respectively, discharge line.

The hydrogen storage electrode comprises an electroconductive hydrogen storage material, for example, palladium, magnesium or magnesium alloys such as MgNi, $Mg_2Cu$, Mg—Ln or intermetallic compounds such as $LiNi_5$, $CaNi_5$ or $LaNi_4.7A10.3$. The hydrogen storage material is made to have a very large surface area. It is for example sponge-like or in the form of a thin film disposed on a substrate. For the apparatus described herein, a particularly large surface area was not used but the usable storage capacity increases with increasing surface area of the hydrogen storage device. In conventional storage devices, the capacity depends generally on the amount of the storage material. The storage material may also be deposited on an electron-conductive carrier material.

As electrolytes, that is as ion conductive materials, solid body electrolytes as well as electrolyte solutions may be used. The electrolyte covers the storage electrode completely or almost completely since the covered surface area is important for the usable capacity. An incomplete covering may be necessary for technical reasons for example in order to provide for gas transport passages.

The electrolyte must not be dissociated by the voltages applied since no electrolysis should take place (energy in the double layer area) capacitive charge rather than Faraday process). Therefore aprotic electrolytes such as salt solutions in methylacetate or dimethylformamide may be more suitable than for example water.

The counter electrode consists of a material with good conductivity for electrons such as gold or platinum. But also less noble metals or conductive polymers, which are not corroded in the electrolyte, may be used. The counter electrode has a large surface area (in order to avoid high current and charge densities) and therefore also consists preferably of a porous or rough surface material.

The voltage and current source must be accurately controllable.

The gas supply or discharge line is for example a linear, branched or net-like system of fine capillaries, pores or small tubes which facilitate a rapid gas transport.

Figure 1:
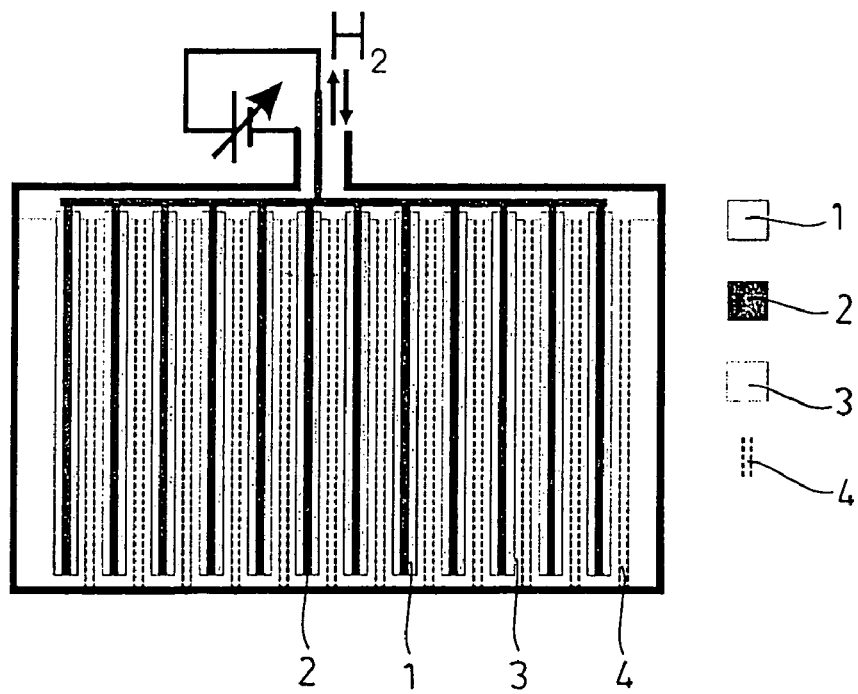
FIGS. 1 to 3 show schematically different storage arrangements.

In the arrangement shown in FIG. 1, the hydrogen storage material 1 is deposited on a conductive carrier material 2 in the form of a thin layer. The counter electrode 4 consists of small tubes with pores for the passage of hydrogen. The tubes are not wetting at the inside and are conductive at the outside.

The two electrodes are in contact with each other by way of the electrolyte.

Figure 2:
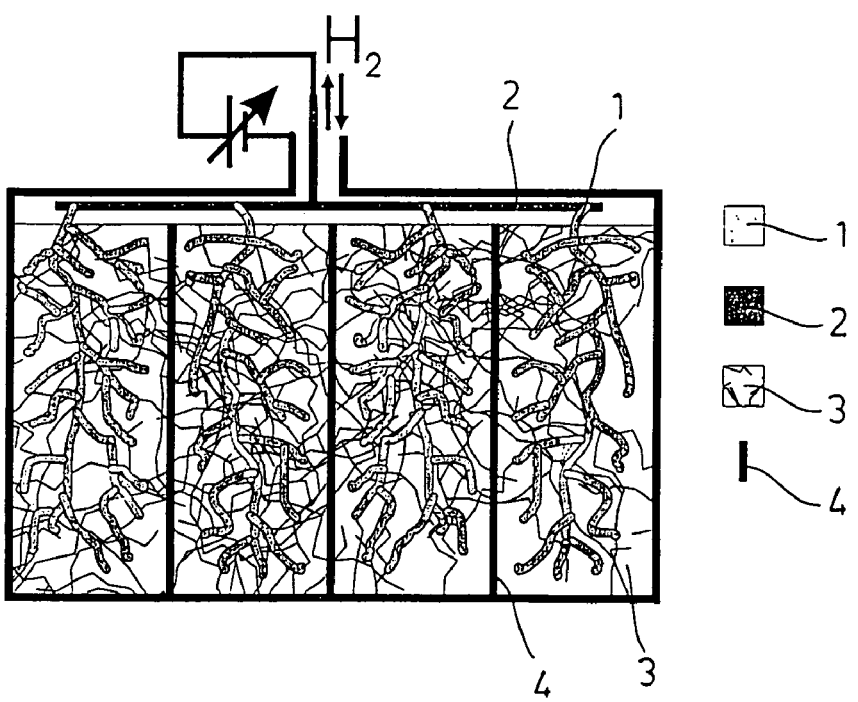

In the arrangement as shown in FIG. 2, the hydrogen storage material 1 consists of branched nanotubes on a conductive carrier material 2. The hydrogen is admitted and conducted out past the porous electrolyte 3.

Figure 3:
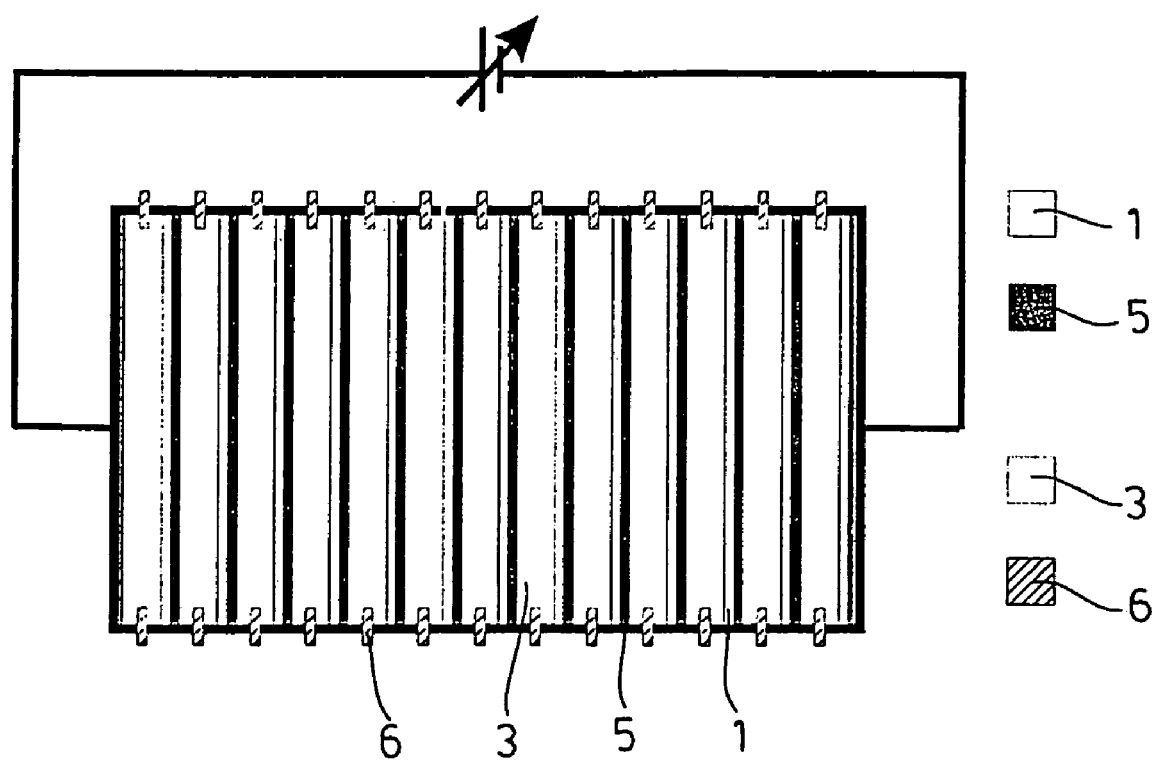

FIG. 3 shows an embodiment with a bipolar electrode arrangement wherein the conductive carrier material 5 serves as counter electrode. The individual electrodes are separated from one another by isolators.

The storage of hydrogen and the subsequent dosed release is made possible by the following method:

For charging the hydrogen storage device with hydrogen, gaseous hydrogen is supplied to the storage device. The hydrogen is conducted in the apparatus through a system of tubes, channels, pores etc. to the hydrogen storage electrode. The gas space extends either to the H-storage electrode (for example, in that also the H storage electrode is tubular or the electrolytes are porous), or the hydrogen is brought into close proximity of the electrode (for example, up to a thin electrolyte layer on the electrode).

The hydrogen is then absorbed by the storage electrode, which consists of a hydrogen storage material such as palladium, magnesium or magnesium alloys, for example, $Mg_2Ni$, $Mg_2Cu$. The storage electrode has a very large surface area and is therefore for example sponge-like, constructed from nanofibers or deposited as a thin layer on a carrier so that the hydrogen can be rapidly absorbed.

When hydrogen is needed, a voltage is applied from the outside between the storage electrode and the counter electrode. As a result, a current will flow through the electrolyte (between the storage and the counter electrodes) which results in a change of the charge and a change in the electrochemical double layer in front of the electrodes. This changes the electronic state density in the electrode such that its storage capacity is reduced. The hydrogen is then released from the electrode, is collected by the gas conduit system and discharged from the apparatus.

The voltage source must provide a constant current intensity (galvano-static operation) in order to provide for a uniform hydrogen release. The voltage used must not exceed the dissociation voltage of the respective electrolyte. The apparatus according to the invention does not carry out any electrolysis: A passage of the charge through the interface electrode/electrolyte is not wanted. Only a surface charge should be generated. If the maximum voltage of the voltage source used exceeds the dissociation voltage, a voltage limiter should be used.

Figure 4:
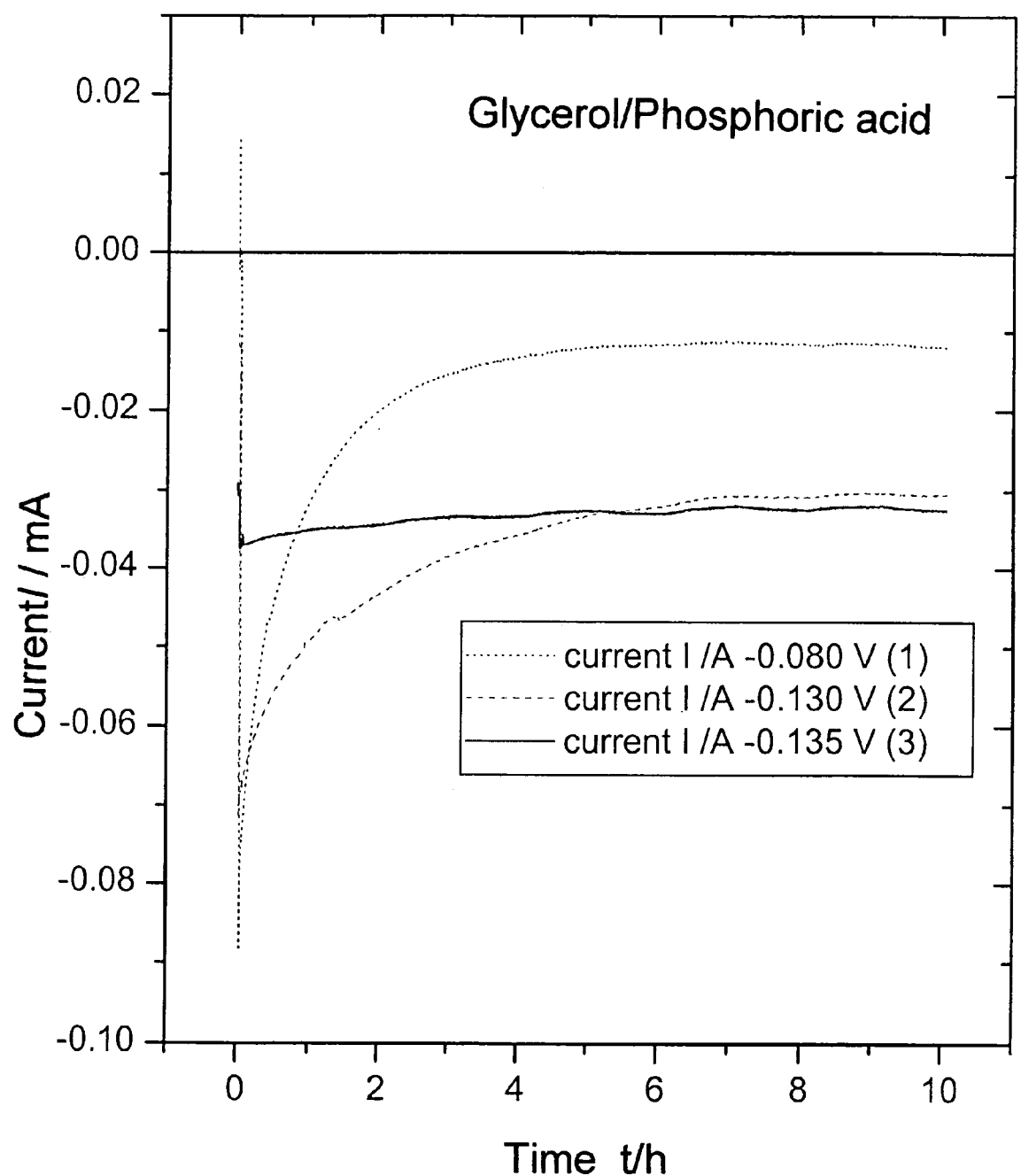
FIGS. 4 to 6 show current-time diagrams of hydrogen charging procedures.
Figure 5:
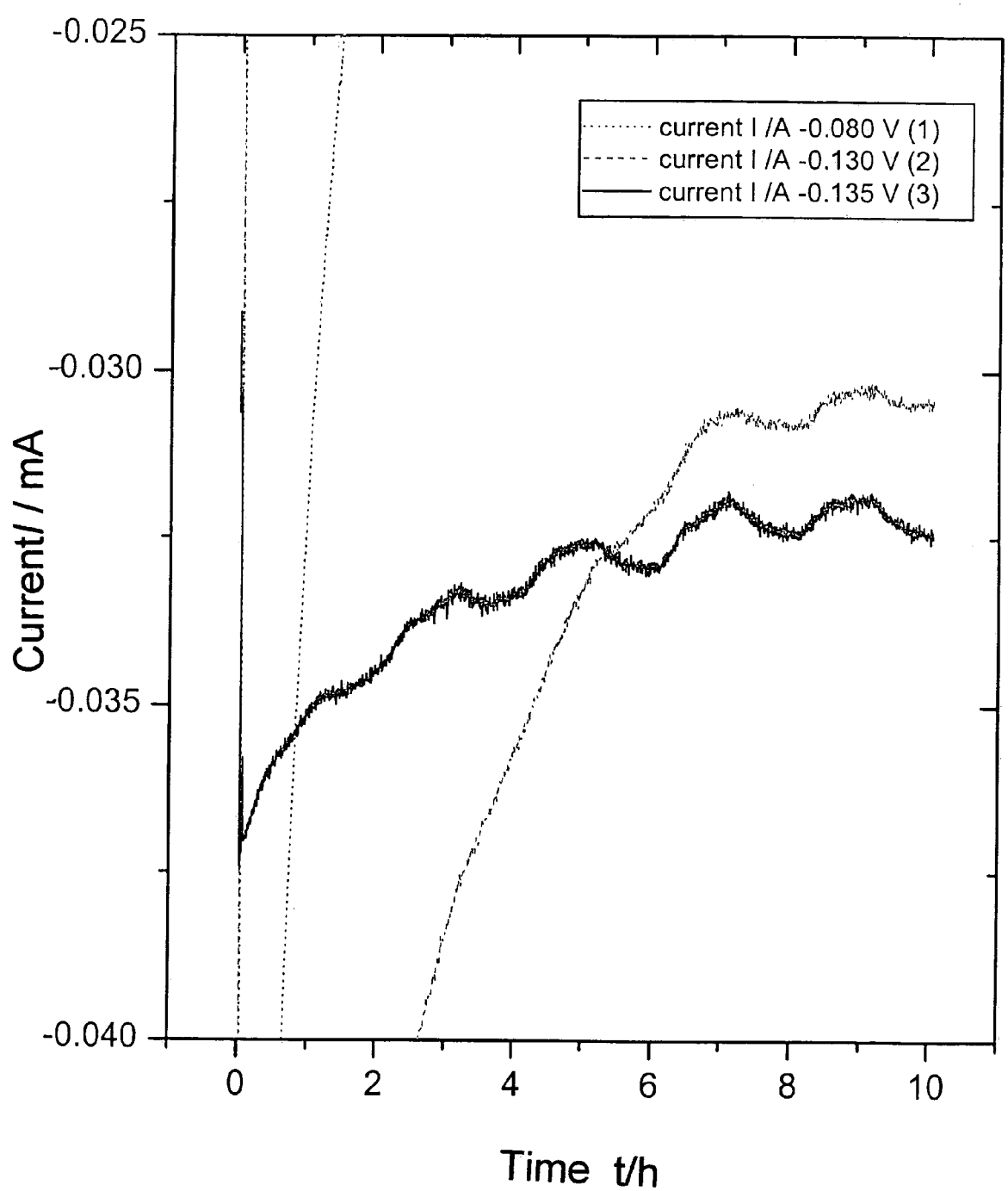

FIG. 4 shows the charge currents of a palladium foil during charging with hydrogen at different voltages, FIG. 5 shows a diagram wherein, on the charge side (lithium perchlorate in methylacetate) the voltage was reversed hourly. The curves include a large current component corresponding to the charge of the whole foil with hydrogen.

Figure 6:
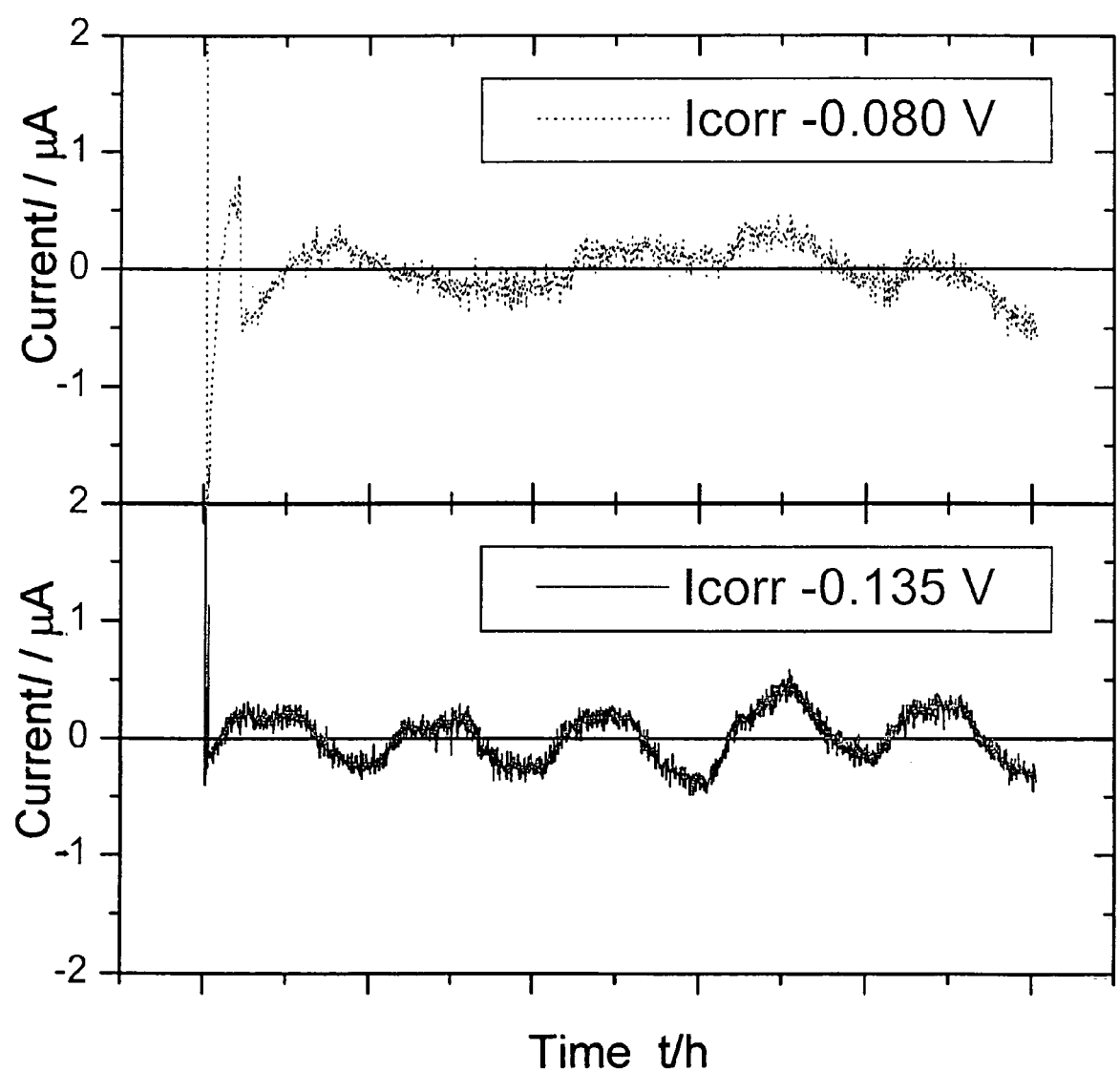

For the representation of FIG. 6, the curves of FIG. 5 were adapted to a double exponential curve, which was differentiated. Now a current signal resulting from the voltage reversal is clearly visible. The dependence on the potential on the charging side is as expected, that is, the hydrogen charge of the palladium reacts particularly sensitively to a change of the electronic state density in the Pd, when the hydrogen charge is close to the phase transition α-α'.

What is claimed is:

1. A method of reversably storing hydrogen in a hydrogen storage device including a hydrogen storage material with an electrode, a counter electrode and an electrolyte disposed between said electrodes, said method comprising the steps of:
   a) charging the hydrogen storage device with hydrogen which is adsorbed by said hydrogen storage material, and
   b) applying a voltage differential to said electrodes for recuperating the hydrogen stored by said storage material and adjusting said voltage differential for controlling the rate of release of said hydrogen by said storage material.

2. A method according to claim 1, wherein during the charging of said hydrogen storage material a counter voltage is applied to said electrodes.

3. A method according to claim 1, wherein for the recuperation of the hydrogen also the temperature of the storage material is increased.

4. A method according to claim 1, wherein said storage material consists of at least one of palladium, magnesium and a magnesium alloy.

5. A hydrogen reservoir, comprising a housing including at least two electrodes and an electrolyte disposed therebetween such that the electrodes are in contact with each other by way of said electrolyte, one of said electrodes being provided with at least one layer of a hydrogen storage material, a hydrogen supply-and discharge line, and a current/voltage source connected to the two electrodes.

* * * * *